(12) United States Patent
Reusen et al.

(10) Patent No.: US 12,675,893 B2
(45) Date of Patent: Jul. 7, 2026

(54) METHOD OF DIGITALLY PROCESSING A PLURALITY OF PIXELS AND TEMPERATURE MEASUREMENT APPARATUS

(71) Applicant: Melexis Technologies NV, Tessenderlo (BE)

(72) Inventors: Wouter Reusen, Tessenderlo (BE); Luc Buydens, Tessenderlo (BE); Adrian Hill, Novi, MI (US)

(73) Assignee: Melexis Technologies NV, Tessenderlo (BE)

( * ) Notice: Subject to any disclaimer, the term of this patent is extended or adjusted under 35 U.S.C. 154(b) by 484 days.

(21) Appl. No.: 17/837,448

(22) Filed: Jun. 10, 2022

(65) Prior Publication Data

US 2022/0405949 A1 Dec. 22, 2022

(30) Foreign Application Priority Data

Jun. 22, 2021 (EP) .................................... 21180884

(51) Int. Cl.
*G06T 7/33* (2017.01)

(52) U.S. Cl.
CPC .... *G06T 7/344* (2017.01); *G06T 2207/10048* (2013.01); *G06T 2207/20072* (2013.01)

(58) Field of Classification Search
CPC .......... G06T 7/344; G06T 2207/20072; G06T 2207/10048
See application file for complete search history.

(56) References Cited

U.S. PATENT DOCUMENTS

| | | | |
|---|---|---|---|
| 9,357,963 B1 * | 6/2016 | Spahn ....................... | G06T 7/11 |
| 10,242,439 B1 * | 3/2019 | Koshti ....................... | G06T 7/50 |
| 2006/0193498 A1 * | 8/2006 | Hartlove .............. | G06V 40/103 |
| | | | 374/E13.003 |
| 2008/0055430 A1 * | 3/2008 | Kirsch ................... | H04N 25/61 |
| | | | 348/E5.079 |

(Continued)

FOREIGN PATENT DOCUMENTS

CN          111623878 A          9/2020

OTHER PUBLICATIONS

C. Gao, D. Meng, Y. Yang, Y. Wang, X. Zhou and A. G. Hauptmann, "Infrared Patch-Image Model for Small Target Detection in a Single Image," in IEEE Transactions on Image Processing, vol. 22, No. 12, pp. 4996-5009, Dec. 2013, (Year: 2013).*

(Continued)

*Primary Examiner* — John Villecco
*Assistant Examiner* — Alexander John Rodgers
(74) *Attorney, Agent, or Firm* — Harness, Dickey & Pierce, P.L.C.

(57) ABSTRACT

A method of digitally processing a plurality of pixels of an image captured using an array of sensing pixels of an optical sensor device. The method comprises identifying a measurement pixel of the plurality of pixels corresponding to a measurement point on a target to be measured. The method then comprises identifying a number of pixels of the plurality of pixels neighbouring the measurement pixel, the number of pixels having a number of intensity values, respectively. A curve is then fitted to the number of pixels and the number of respective intensity values. An estimated intensity value is then determined from the curve in respect of the measurement pixel, thereby simulating a predetermined field of view in respect of the measurement pixel narrower than an actual field of view of the measurement pixel.

15 Claims, 3 Drawing Sheets

(56)                    References Cited

U.S. PATENT DOCUMENTS

| 2008/0266413 | A1* | 10/2008 | Cohen | G06T 5/94 |
| | | | | 348/222.1 |
| 2014/0016879 | A1* | 1/2014 | Hogasten | H04N 25/671 |
| | | | | 382/264 |
| 2014/0037225 | A1* | 2/2014 | Hogasten | H04N 5/33 |
| | | | | 382/260 |
| 2016/0142608 | A1* | 5/2016 | Afrooze | H04N 23/76 |
| | | | | 348/222.1 |
| 2016/0338594 | A1* | 11/2016 | Spahn | G06T 7/11 |
| 2018/0205898 | A1* | 7/2018 | Johansson | H04N 25/67 |

OTHER PUBLICATIONS

Rodriguez-Lozano FJ, LeÃ³n-GarcÃa F, Ruiz de Adana M, Palomares JM, Olivares J. Non-Invasive Forehead Segmentation in Thermographic Imaging. Sensors (Basel). Sep. 22, 2019;19(19):4096 (Year: 2019).*

K. J. Nowicki, C. S. Edwards and P. R. Christensen, "Post-projection removal of row- and column-correlated noise in line-scanning data: Application to THEMIS infrared data," 2013 5th Workshop on Hyperspectral Image and Signal Processing: Evolution in Remote Sensing (WHISPERS), Gainesville, FL, USA (Year: 2019).*

Fitzgibbon, Andrew W., and Robert B. Fisher. A buyer's guide to conic fitting. Edinburgh, UK: University of Edinburgh, Department of Artificial Intelligence, 1996. (Year: 1996).*

Song, Liming, et al. "Research on sub-pixel location of the laser spot center." 2013 5th International Conference on Intelligent Human-Machine Systems and Cybernetics. vol. 2. IEEE, 2013. (Year: 2013).*

Kong, Multiscale Fusion of Visible and Thermal IR Images for Illumination-Invariant Face Recognition, 2006, Int. J. Comp. Vision 71 (2): 215-233. (Year: 2006).*

European Search Report for European Application No. 21180884 dated Dec. 2, 2021.

* cited by examiner

METHOD OF DIGITALLY PROCESSING A PLURALITY OF PIXELS AND TEMPERATURE MEASUREMENT APPARATUS

CROSS-REFERENCE TO RELATED APPLICATIONS

The present application claims priority under 35 U.S.C. § 119 to European Patent Application No. EP21180884.5, filed Jun. 22, 2021, the entire contents of which are incorporated herein by reference.

FIELD

The present invention relates to a method of digitally processing at least part of an image captured by a plurality of pixels, the method being of the type that, for example, models intensities of pixels. The present invention also relates to a temperature measurement apparatus of the type that, for example, estimates a temperature of a sample under test without contacting the sample under test.

BACKGROUND

Numerous applications exist for the measurement of a point on a sample under test. The sample under test can be in vitro or in vivo. Particularly, but not exclusively, in relation to the latter type of sample under test, for some applications it is desirable to be able to measure a temperature in respect of a point on a subject, for example a human being. In this regard, whilst a number of known measurement techniques require the placement of a temperature sensor close to the point or spot to be measured, for example on a forehead, it is further desirable to measure the temperature of the spot from a distance for some applications. By way of example, in some healthcare-related contexts it is desirable to maintain a minimum distance between an operator of a temperature measurement apparatus and a subject in order to minimise any potential risk presented to the health of the operator by the subject. Other healthcare-related applications also exist where a distance between the temperature measurement apparatus and the subject preferably has to be maintained, for example where a temperature measurement is being performed in an automated manner and the temperature measurement apparatus is located in a fixed position and it is undesirable for the subject to come into contact with a sensor of the temperature measurement apparatus for reasons of hygiene and/or it is inconvenient and/or uncomfortable for the subject to come into contact with the sensor.

In the field of optical detection, an optical sensor device typically comprises a die packaged within a housing. The die comprises a plurality of sensor elements constituting pixels. A light-receiving side of the die is disposed opposite an aperture provided in the housing and a lens is disposed within the aperture to form a window.

In operation, light received by the sensor elements, for example light in the infra-red range of the electromagnetic spectrum, is translated from the optical domain to the electrical domain. However, positioning of the lens during manufacture is prone to inaccuracy, which in turn leads to a mismatch between the distance between the lens and the die and the focal length of the lens. Consequently, received light incident upon the lens is diffused over multiple neighbouring pixels of the die. Such diffusion can be considered equivalent to application of a filter, for example by convolution, which is usually undesirable and sometimes referred to as undesirable convolution.

In order to attempt to mitigate the diffusion that takes place, it is known to apply a so-called kernel to the output of the pixels by way of deconvolution processing. However, such deconvolution processing places a demand on the processing power of any signal processing apparatus coupled to the optical sensor device that is charged with performing the deconvolution. The demand on the processing power is accompanied by a consequential consumption of electrical power. Where processing power is limited, a time penalty can be incurred when performing the deconvolution, which can be undesirable for applications where relatively rapid measurement results are required. Some applications require operation under conditions of limited electrical power availability and so such deconvolution processing results in an undesirable additional consumption of power. Where electrical cells are used to power the signal processing apparatus, this can lead to accelerated depletion of the electrical cells and thus a shortening of the in-service time window of any temperature measurement apparatus comprising the optical sensor device and the signal processing apparatus. Furthermore, such deconvolution processing is not completely successful, and some diffusion over multiple pixels nevertheless remains.

SUMMARY

According to a first aspect of the present invention, there is provided a method of digitally estimating an intensity value associated with an electrical signal generated by a pixel of an array of sensing pixels of an optical sensor device, the method comprising: identifying a measurement pixel of the plurality of pixels corresponding to a measurement point on a target to be measured; identifying a number of pixels of the plurality of pixels neighbouring the measurement pixel, the number of pixels having a number of intensity values, respectively; fitting a curve to the number of pixels and the number of respective intensity values; and determining an estimated intensity value from the curve in respect of the measurement pixel, thereby simulating a predetermined field of view in respect of the measurement pixel narrower than an actual field of view of the measurement pixel.

The number of pixels identified having the number of intensity values may respectively correspond to different locations on the target to be measured. Neighbouring locations of the different locations on the target to be measured may be spaced with respect to each other.

The curve may be fitted with respect to distances of the number of pixels from the measurement pixel.

The distances of the number of pixels from the measurement pixel may comprise a first distance and a second distance; the first distance may comprise an intra-pixel distance and the second distance may comprise an inter-cluster distance; and the intra-pixel distance may be different from the inter-cluster distance.

The number of pixels may be located within a row of the array of pixels comprising the measurement pixel.

The method may further comprise: identifying another number of pixels of the plurality of pixels neighbouring the measurement pixel, the another number of pixels having another number of intensity values, respectively; fitting another curve to the another number of pixels using the another number of respective intensity values; and determining another estimated intensity value from the another curve in respect of the measurement pixel.

The another number of pixels may be located in a column of the array of pixels comprising the measurement pixel or a diagonal line in the array of pixels comprising the measurement pixel.

The method may further comprise: using the fitted intensity value and the another fitted intensity value to determine a further estimated intensity value in respect of the measurement pixel.

The method may further comprise: fitting the curve using a polynomial best fit algorithm or a bilinear interpolation algorithm.

The method may further comprise: fitting the another curve using a polynomial best fit algorithm or a bilinear interpolation algorithm.

Identifying the measurement pixel may further comprise: searching the array of pixels in groups of a predetermined size in order to identify a block comprising a pixel having a highest intensity.

The groups of pixels of the predetermined size may constitute a tessellation of a predetermined shape.

Searching the array of pixels may comprise summing intensities of pixels in respect of each group of pixels of the tessellation of groups of pixels to yield a plurality of group intensity values, and identifying a highest group intensity value of the plurality of group intensity values, thereby identifying the block comprising the pixel having the highest intensity.

The method may further comprise applying a weight to each sum of intensity values to yield the plurality of group intensity values.

The groups of pixels may constitute windows of pixels.

The method may further comprise: identifying the measurement pixel by estimating an intensity value for a number of groups of pixels of the array of pixels, thereby yielding a plurality of estimated intensity values.

The method may further comprise: selecting a highest value amongst the plurality of estimated intensity values as the measurement pixel.

The method may further comprise: performing an alignment operation with respect to the target to be measured in order to identify the measurement pixel of the plurality of pixels corresponding to the measurement point on the target to be measured.

According to a second aspect of the present invention, there is provided a method of measuring a temperature, the method comprising: digitally estimating an intensity value in accordance with the method as set forth above in relation to the first aspect of the invention; and comparing the estimated intensity value with a predetermined intensity threshold value in order to determine whether the estimated intensity value corresponds to a temperature exceeding a threshold temperature value corresponding to the predetermined intensity threshold value.

According to a third aspect of the present invention, there is provided a temperature measurement apparatus comprising: a plurality of sensor pixels configured to capture a thermal image; a data point selector configured to identify a measurement pixel of the plurality of pixels corresponding to a measurement point on a target to be measured, the data point selector also being configured to identify a number of pixels of the plurality of pixels neighbouring the measurement pixel, the number of pixels having a number of intensity values, respectively; a curve fitting engine configured to fit a curve to the number of pixels and the number of respective intensity values; and a curve reader configured to determine an estimated intensity value from the curve in respect of the measurement pixel, thereby simulating a predetermined field of view in respect of the measurement pixel narrower than an actual field of view of the measurement pixel.

It is thus possible to provide a method and apparatus possessing improved temperature estimation capabilities for a desired location on a sample under test. The method and apparatus enable existing temperature sensors having known inaccuracies to be employed with better effectiveness. Furthermore, the method and apparatus result in rapid estimation of temperature without associated demands in processing power being placed upon signal processing circuitry that other signal processing techniques can impose. Additionally, the efficient use of processing power results in lower electrical power consumption and the apparatus therefore benefits from improved operational uptime as compared with the use of other processor intensive signal processing techniques, for example deconvolution.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
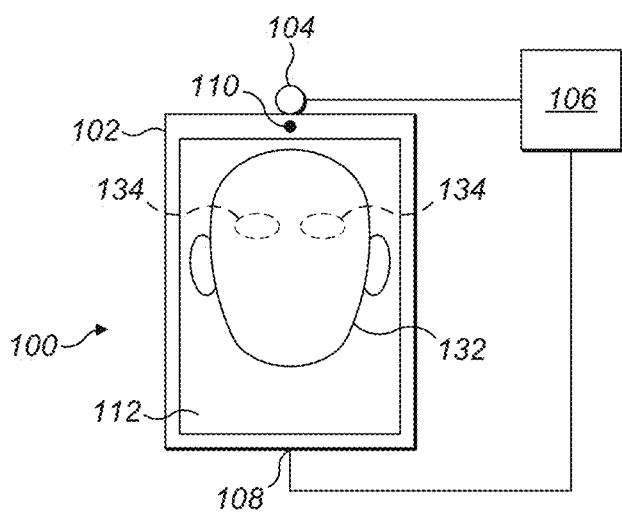
FIG. 1 is a schematic diagram of a temperature measurement system constituting an embodiment of the invention.

Throughout the following description, identical reference numerals will be used to identify like parts.

Referring to FIG. 1, a temperature measurement system 100 comprises a temperature measurement apparatus. The temperature measurement system 100 comprises a computing device 102, for example any general purpose tablet or slate computing device, operably coupled to an optical sensor device 104 of the temperature measurement apparatus, the optical sensor device 104 being capable of sensing in the infra-red range of the electromagnetic radiation spectrum. The system 100 also comprises signal processing circuitry 106 of the temperature measurement apparatus, the signal processing circuitry 106 being operably coupled to the optical sensor device 104 and an input/output (I/O) port 108 of the computing device 102. The computing device 102 also comprises a camera 110 and a display 112.

Figure 2:
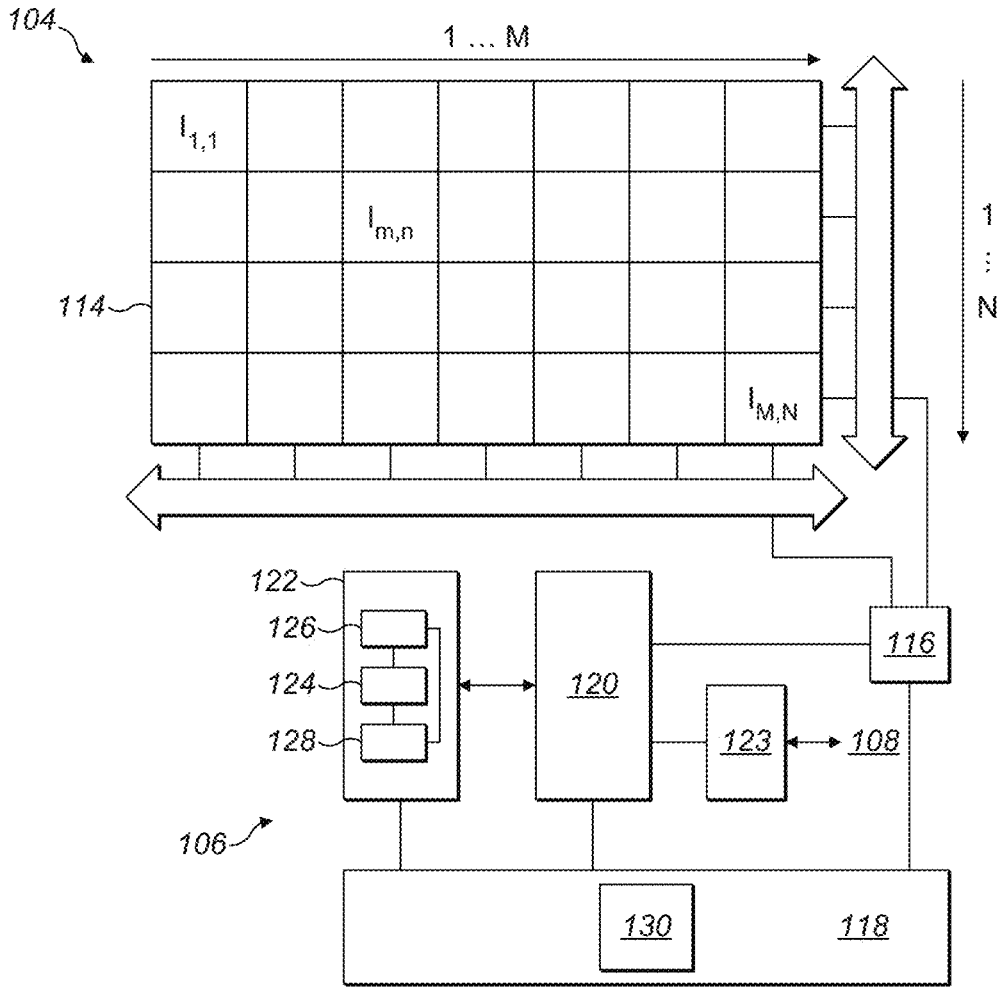
FIG. 2 is a schematic diagram a temperature measurement apparatus of the system of FIG. 1 and constituting another embodiment of the invention.

Turning to FIG. 2, the optical sensor device 104 is a thermal sensor device comprising an array of thermal sensing pixels 114 operably coupled to the signal processing circuitry 106. In this example, the array of thermal sensing pixels 114 is arranged as a logical rectangular matrix of M columns of pixels and N rows of pixels. An example of a suitable array of thermal sensing pixels is the MLX90640 far infrared thermal sensor array available from Melexis Technologies, NV. The signal processing circuitry 106 comprises an image capture module 116 operably coupled to the array of thermal sensing pixels 114. As a description of the detail of the structure and/or operation of the image capture module 116 is not central to an understanding of this or other embodiments, for the sake of conciseness and simplicity of description, the image capture module 116 will not be described in further detail herein.

In this example, the signal processing circuitry 106 also comprises a data store, for example a memory 118, such as Random Access Memory (RAM) and/or non-volatile memory, an alignment unit 120, and a temperature estimation unit 122. The alignment unit 120 is operably coupled to an interface unit 123 of the signal processing circuitry 106, the interface unit 123 being operably coupled to the I/O port 108 of the computing device 102. The image capture module 116 is operably coupled to the memory 118 and the alignment unit 120. Likewise, the alignment unit 120 and the temperature estimation unit 122 are operably coupled to the memory 118. The alignment unit 120 and the temperature estimation unit 122 constitute parts of a processing resource. The temperature estimation unit 122 supports and thus comprises a data point selector 124, a curve fitting engine 126 and a curve lookup unit 128. In this example, the memory 108 is configured to store, inter alia, captured image data 130.

It should be noted that although the array of thermal sensing pixels 114 is logically arranged as a uniform array, it has been recognised that, in practice, the array of thermal sensing pixels 114 comprises repeating clusters of pixels and such arrangement of clusters of pixels influences the results of signal processing to ameliorate the effects of the diffusion of received light over multiple neighbouring pixels of the array of thermal sensing pixels 114. In this example, each cluster of pixels is itself a sub-array of K×L pixels, where K is the number of rows and L is the number of columns. Furthermore, pixels within a cluster have a first substantially consistent distance therebetween, constituting an intra-cluster distance, $p_i$, and neighbouring clusters are separated by a second substantially consistent distance, constituting an inter-cluster distance, $p_o$. In this regard, failure to consider the clustered arrangement of the pixels leads to errors when attempting to compensate for the diffusion of received light over multiple neighbouring pixels of the array of thermal sensing pixels 114. Although, in this example, the clusters are rectangular clusters, the skilled person will appreciate that other cluster shapes are contemplated, for example hexagonal shaped clusters.

Figure 3:
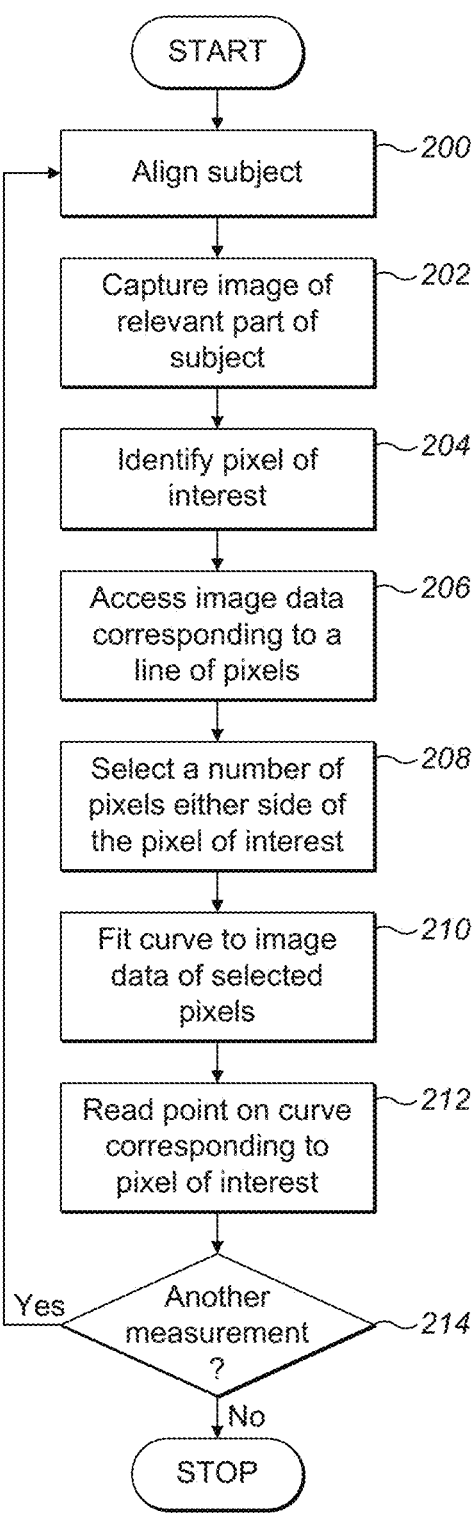
FIG. 3 is a flow diagram of a method of processing a plurality of pixels constituting a further embodiment of the invention.

In operation (FIG. 3), prior to measuring the temperature of a point of interest of a sample under test, where the sample under test is in vivo and, for example part of the human body, it is necessary to align the subject to the temperature measurement system 100. In this example, the point of interest is a point on the forehead of the subject, for example to a visitor to a building, such as a business premises. In this regard, the computing device 102 can typically be used for visitors to sign into the building for any number of reasons including advice of arrival to the host of the visitor and/or compliance with fire safety regulations. In any event, and for example, as part of a sign-in process, the subject is required to participate (Step 200) in an alignment process. In one example, the alignment unit 120 can cooperate with a suitable software application executing on the computing device 102 via the interface unit 123 and the I/O port 108. The software application can display a schematic outline of a human head 132 (FIG. 1) including eye locator markers 134 on the display 112. Using the camera 110, the software application can also capture and display time-varying images of the head of the subject relative to the schematic outline of the human head 132 and request that the subject stands at an appropriate distance from the computing device 102 so that their head fits as closely as possible within the schematic outline of the human head 132 and their eyes, as displayed by the computing device 102 align as best as possible with the eye locator markers 134. Once the software application determines that the subject is sufficiently well aligned with the computing device 102, the software application sends a subject_aligned message to the alignment unit 120 whereupon the alignment unit 120 sends an image capture command to the image capture module 116.

In response to receipt of the image capture command, the image capture module 116 captures (Step 202) a thermal image of the subject, in particular the forehead of the subject, which in this example is the relevant part of the subject. In this regard, the field of view of the thermal sensor device 104 is narrower than field of view of the camera 110 and the thermal sensor device 104 is preconfigured so that the thermal sensor device 104 is aimed at a region in space corresponding to the forehead of the subject, when the subject is sufficiently well aligned with respect to the camera 110 of the computing device 102.

Infrared electromagnetic radiation emitted by the forehead of the subject is received by the array of thermal sensing pixels 114 within the field of view of the thermal sensor device 104. In this example, the thermal image captured contains a thermal representation of the forehead of the subject. As captured, diffusion across neighbouring pixels of the array of thermal sensing pixels 114 has occurred, which requires amelioration by way of digital processing of the plurality of pixels of the captured image acquired using the array of thermal sensing pixels 114.

The infrared electromagnetic radiation received by the array of thermal sensing pixels 114 is converted from the optical domain to the electrical domain. The image capture module 116 receives electrical signals from the array of thermal sensing pixels 114 representing raw intensity measurement data in respect of the infrared electromagnetic radiation received by each pixel of the array of thermal sensing pixels 114. The raw intensity data received by the image capture module 116 is stored as the captured image data 130 in the memory 118. As mentioned above, the array of thermal sensing pixels 114 is logically arranged as an M×N matrix of pixels, and in this example the raw intensity data is stored in the memory 118 in a manner that is indexed by row and column of the array of thermal sensing pixels 114, for example $I_{m,n}$, where I is the intensity measured by the pixel in the $M^{th}$ column and $N^{th}$ row. In this example, prior to further processing, the raw intensity data is normalised. If it can be assumed that the normalised raw intensity data is comparable, the temperature data does not necessarily have to be determined. Since determination of the temperature data is calculation-intensive and therefore increases the power budget associated with making a temperature measurement, obviating the need to calculate the temperature data from the raw intensity data is beneficial. However, in other examples, the temperature data can, assuming the array of thermal sensing pixels is an array of thermopiles, be calculated from the raw intensity data using any suitable calculation or calculations applying the Stefan-Boltzmann's law and any other suitable pre-processing steps required.

Figure 4:
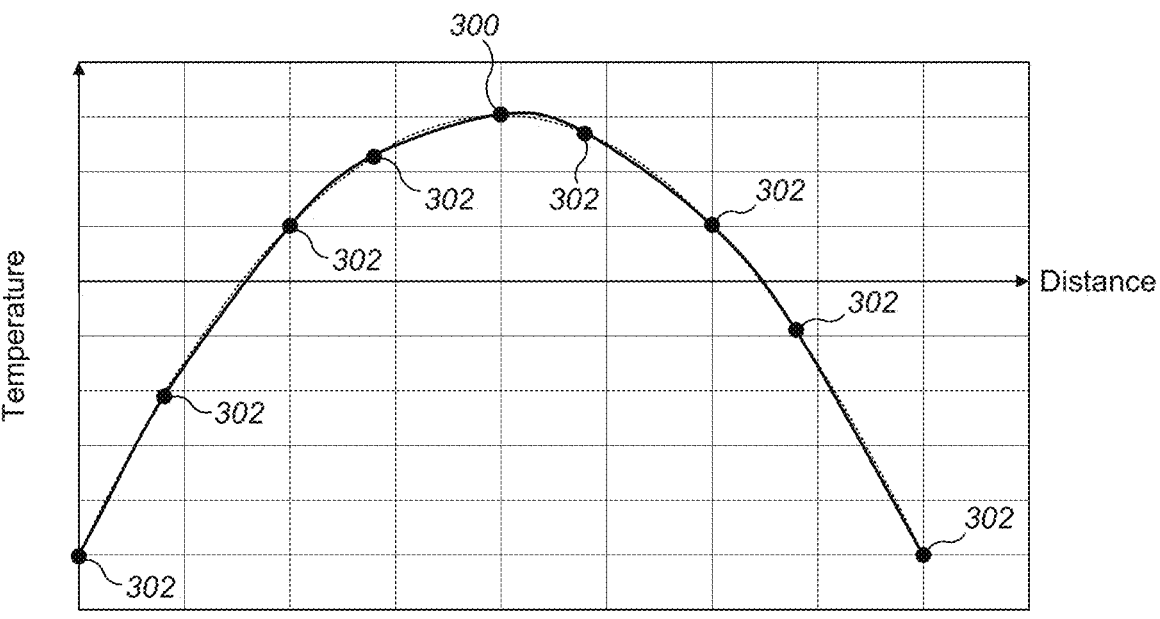
FIG. 4 is a graph of a fitted curve in accordance with the method of FIG. 3.

In this example, it is desirable to measure the temperature of the subject in respect of a predetermine point on the forehead of the subject, typically a central point on the forehead of the subject. In this regard, and in this example, a geometrically central pixel 300 (FIG. 4) with respect to the captured thermal image of the forehead of the subject is selected (Step 204) by the data point selector 124 and constitutes a selected pixel of interest with respect to the array of thermal sensing pixels 114. The data point selector 124 communicates the selected pixel of interest to the curve lookup unit 128 for subsequent use. In the meantime, the data point selector 124 next identifies (Step 206) measurement data from the captured image data 130 corresponding to a line of pixels passing through the selected pixel of interest 300.

Once the line of pixels has been identified, the data point selector 124 selects (Step 208) a number of pixels 302 either side of the pixel of interest 300 and communicates the selected pixels to the curve fitting engine 126.

Upon receipt of the selected pixels, the curve fitting engine 126 fits (Step 210) a curve to the intensity values provided and their respective linear location along the line of pixels selected. It should be understood that curve fitting does not necessarily require a curve to be plotted. In this example, the fitting is in respect of distances of the neighbouring pixels with respect to the selected pixel of interest. As such, the fitting does not simply assume uniform spacing between pixels of the array of sensing pixels 114 and when a distance is calculated between the selected pixel of interest and a neighbouring pixel, the actual distance is calculated using the intra-cluster and inter-cluster distances, $p_i$, $p_o$, in order to determine more accurately the distance between the selected pixel of interest and the neighbouring pixel. In this regard, the distance between one pixel 302 neighbouring the selected pixel of interest 300 and the selected pixel of interest 300 can comprise the intra-cluster distance, $p_i$, or the inter-cluster distance, $p_o$, or a combination thereof. Likewise, another pixel neighbouring the selected pixel of interest 300 and the selected pixel of interest 300 can comprise the intra-cluster distance, $p_i$, or the inter-cluster distance, $p_o$, or a combination thereof. In this regard, the distance between the selected pixel of interest 130 (distance_between_pixels) and a given neighbouring pixel can be generally expressed as follows:

$$distance\_between\_pixels = c \times p_o + d \times p_i \qquad (2)$$

where $p_o$ is an inter-cluster distance, $p_i$ an intra-cluster distance, and c and d are constants. By placing the intensities of neighbouring pixels at their correct relative distance to the selected pixel of interest 300 prior to curve fitting, the estimate of the intensity of the selected pixel of interest 300 can be determined with greater accuracy.

Any suitable curve fitting technique can be employed by the curve fitting engine 126, for example a polynomial best fit technique, a bilinear interpolation technique or a bicubic interpolation technique.

Once the curve has been generated, the curve reader unit 128, using the identity of the selected pixel of interest 300 with respect to the line of pixels selected by the data point selector 124, interrogates (Step 212) the curve fitting engine 126 in order to obtain an intensity value corresponding to the selected pixel of interest 300, which is then translated to a temperature using, for example the Stefan-Boltzmann's law and any other suitable known processing steps. Thereafter, the temperature estimator 122 determines (Step 214) whether another temperature needs to be measured, for example in the event that the temperature of another subject needs to be measured or an average of multiple temperature measurements is to be calculated. The above process (Steps 200 to 212) is repeated until no further temperature measurements are required.

Owing to the above-mentioned diffusion of received light over multiple neighbouring pixels of the array of thermal sensing pixels 114, the effective field of view of the selected pixel of interest 300 is wider than desirable. The effect of estimating the intensity of electromagnetic radiation received by the selected pixel of interest 300 in the above-described manner is to simulate receipt of the electromagnetic radiation by the selected pixel of interest 300 with a narrower field of view than the actual field of view in practice. In this regard, each pixel of the array of thermal sensing pixels 114 receives electromagnetic radiation from multiple points on the relevant part of the subject, constituting a measurement area of the subject. The measurement by a given pixel of the array of thermal sensing pixels 114 is therefore an accumulation of electromagnetic radiation from a number of points on the measurement area within a field of view of the given pixel. As such, the estimated intensity of electromagnetic radiation selected provides greater granularity with respect to a position within the measurement area from which electromagnetic radiation is received and thus corresponds to a smaller effective field of view as compared with an aggregated intensity value generated by a given pixel receiving the electromagnetic radiation from the position within the measurement area.

The temperature measured can then, for example, be compared relative to a threshold value in order to determine whether the estimated temperature of the subject is considered sufficiently high to suggest that the subject may have a medical condition. The assessment with respect to the threshold can either be performed by the temperature estimator 122 or the estimated temperature can be communicated to the software application being executed on the computing device 102 and the software application can be configured to assess the estimated temperature received from the signal processing circuitry 106.

Figure 5:
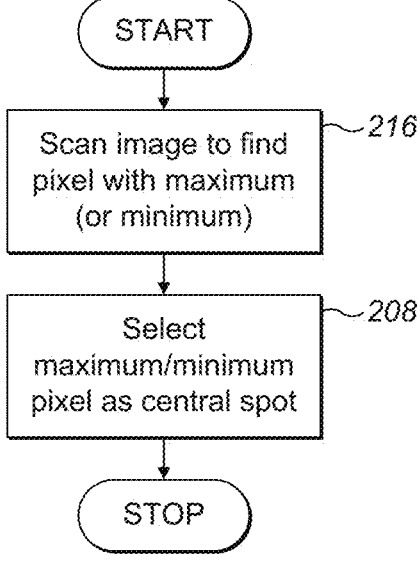
FIG. 5 is a flow diagram of an optional and supplemental search technique for use with the method of FIG. 3.

In another embodiment, instead of selecting a geometrically central pixel with respect to the forehead of the subject, a search can be performed in order to identify, for example a pixel that has detected a largest temperature amongst all the pixels in the array of thermal sensing pixels 114. In this regard, and referring to FIG. 5, the identification of the pixel of interest (Step 204) is implemented by the data point selector 124 scanning (Step 216) through the measured pixel intensities of the captured image data 130 stored in the memory 118. A pixel index corresponding to a current highest measured temperature is recorded and continually updated throughout the scan. At the end of the scan, the pixel corresponding to the maximum temperature measurement, constituting an output of the temperature measurement system 100, is then selected (Step 218) as the pixel of interest 300. The process to estimate the temperature in respect of the selected pixel of interest 300 is then performed as described above. In other examples, the search can be performed in respect of windows of pixels.

In this regard, in another example, the selected pixel of interest can be determined by searching the array of sensing pixels 114 in groups of a predetermined size in order to identify a block comprising a pixel having a highest intensity. In some examples, the groups of pixels of the predetermined size can constitute a tessellation of a predetermined shape.

In another example, searching the array of sensing pixels 114 can comprise summing intensities of pixels in respect of each group of pixels of the tessellation of groups of pixels to yield a plurality of group intensity values. The block comprising the pixel having the highest intensity can be identified by identifying a highest group intensity value of the plurality of group intensity values. In other examples, a weight can be applied to each sum of intensity values to yield the plurality of group intensity values.

In a further example, the pixel of interest 300 is selected by subdividing the captured image data 130 into groups of pixels in respect of the array of thermal sensing pixels 114 and identifying respective candidate pixels of interest for each group of pixels, for example a pixel in each group having a highest intensity value associated therewith. For each candidate pixel of interest, the intensity measured by the candidate pixel of interest is estimated and then the highest estimated intensity is identified amongst all the calculated estimates and the candidate pixel of interest corresponding to the identified highest estimated intensity is selected as the pixel of interest 300.

The skilled person should appreciate that the above-described implementations are merely examples of the various implementations that are conceivable within the scope of the appended claims. Indeed, it should be appreciated that although the examples set forth herein refer to a horizontal line passing through the pixel of interest 300, other lines of pixels can be selected in order to estimate the temperature measured by the pixel of interest 300, for example columns of pixels or diagonal lines of pixels. In other examples, more than one line of pixels passing through the pixel of interest can be selected and curves respectively fitted to the different lines selected. Thereafter, the multiple estimates made can be subjected to statistical analysis, for example the calculation of an average. In another example, a peak detection algorithm can be applied to the fitted curve or curves. Where multiple curves have been derived, a maximum peak value can be selected or the peak values can be subjected to statistical analysis, for example calculation of an average. In this regard, the individual temperature estimates of the multiple estimates can be determined using the same curve fitting technique or different curve fitting techniques.

In the above examples, the temperature measurement system 100 is configured to estimate a maximum temperature. However, in other examples, minimum temperatures can be estimated or temperatures within a predetermined range of temperatures can be estimated. In this regard, the process of scanning the temperatures measured by the array of thermal sensing pixels 114 (FIG. 5) can be configured to target a minimum temperature or a specific range of temperatures.

It should be appreciated that references herein to "infra-red", other than where expressly stated otherwise, are intended as references to electromagnetic energy having wavelengths in the range of 700 nm to 1 mm, such as 760 nm to 1 mm or 700 nm to 1500 nm, which includes electromagnetic radiation in the near infrared region, the middle infrared region and the far infrared region.

What is claimed is:

1. A method of digitally estimating an intensity value associated with an electrical signal generated by a pixel of an array of sensing pixels of an optical sensor device, the method comprising:
   (a) identifying a measurement pixel of a plurality of pixels corresponding to a measurement point on a target to be measured;
   (b) identifying a first number of pixels corresponding to a line of pixels passing through the measurement pixel;
   (c) identifying a second number of pixels of the first number of pixels either side of the measurement pixel, the second number of pixels having a number of intensity values, respectively;

(d) fitting a curve to the number of respective intensity values of the second number of pixels and respective linear locations of the second number of pixels along the line of pixels passing through the measurement pixel; and
   (e) obtaining an estimated intensity value by referencing a relationship defined by the curve in respect of the measurement pixel, thereby simulating a predetermined field of view in respect of the measurement pixel narrower than an actual field of view of the measurement pixel.

2. The method according to claim 1, wherein the curve is fitted with respect to distances of the second number of pixels from the measurement pixel.

3. The method according to claim 2, wherein the distances of the second number of pixels from the measurement pixel comprises a first distance and a second distance, the first distance comprising an intra-pixel distance and the second distance comprises an inter-cluster distance, the intra-pixel distance being different from the inter-cluster distance.

4. The method according to claim 1, wherein the second number of pixels is located within a row of the array of pixels comprising the measurement pixel.

5. The method according to claim 4, further comprising:
   identifying a third number of pixels of the first number of pixels, the third number of pixels having another number of intensity values, respectively;
   fitting another curve to the third number of pixels using the another number of respective intensity values; and
   determining another estimated intensity value from the another curve in respect of the measurement pixel.

6. The method according to claim 5, wherein the third number of pixels is located in a column of the array of pixels comprising the measurement pixel or a diagonal line in the array of pixels comprising the measurement pixel.

7. The method according to claim 5, further comprising:
   using the estimated intensity value and the another estimated intensity value to determine a further estimated intensity value in respect of the measurement pixel.

8. The method according to claim 1, further comprising:
   fitting the curve using a polynomial best fit algorithm or a bilinear interpolation algorithm.

9. The method according to claim 1, wherein identifying the measurement pixel further comprises:
   searching the array of pixels in groups of pixels of a predetermined size in order to identify a block comprising a pixel having a highest intensity.

10. The method according to claim 9, wherein the groups of pixels of the predetermined size constitute a tessellation of a predetermined shape.

11. The method according to claim 9, wherein the groups of pixels constitute windows of pixels.

12. The method according to claim 1, further comprising:
   identifying the measurement pixel by estimating an intensity value for a number of groups of pixels of the array of pixels, thereby yielding a plurality of estimated intensity values.

13. The method according to claim 12, further comprising:
   selecting a highest value amongst the plurality of estimated intensity values as the measurement pixel.

14. The method according to claim 1, the method further comprising:
   performing an alignment operation with respect to the target to be measured in order to identify the measurement pixel of the plurality of pixels corresponding to the measurement point on the target to be measured.

15. A temperature measurement apparatus comprising:

a plurality of sensor pixels configured to capture a thermal image; and a processing signal circuit configured to:

identify, after capture of the thermal image, a measurement pixel of the plurality of sensor pixels corresponding to a measurement point on a target to be measured;

identify, after the identification of the measurement pixel, a first number of pixels corresponding to a line of pixels passing through the measurement pixel;

identify, after the identification of the first number of pixels, a second number of pixels of the first number of pixels either side of the measurement pixel, the second number of pixels having a number of intensity values, respectively;

fit, after the identification of the second number of pixels, a curve to the number of respective intensity values of the second number of pixels and respective linear locations of the second number of pixels along the line of pixels passing through the measurement pixel; and obtain, after the fitting of the curve, an estimated intensity value by referencing a relationship defined by the curve in respect of the measurement pixel, thereby simulating a predetermined field of view in respect of the measurement pixel narrower than an actual field of view of the measurement pixel.

* * * * *